INVENTOR.
ELMER E. HOWARD

June 11, 1968          E. E. HOWARD          3,387,957

MICROCRYSTALLINE, SINTERED BAUXITE ABRASIVE GRAIN

Filed April 4, 1966          2 Sheets-Sheet 2

INVENTOR.
ELMER E. HOWARD
BY
ATTORNEY

United States Patent Office 3,387,957
Patented June 11, 1968

3,387,957
MICROCRYSTALLINE SINTERED BAUXITE
ABRASIVE GRAIN
Elmer E. Howard, Eggertsville, N.Y., assignor to The Carborundum Company, Niagara Falls, N.Y., a corporation of Delaware
Continuation-in-part of application Ser. No. 214,895, Aug. 6, 1962. This application Apr. 4, 1966, Ser. No. 554,606
17 Claims. (Cl. 51—298)

This application is in part a continuation of application Ser. No. 214,895, filed Aug. 6, 1962, and now abandoned.

This invention relates to the manufacture of sintered, nonvitreous abrasive grain of elongated geometrical shape and controlled grit size preferably from aluminous abrasive material such as bauxite. More particularly the invention relates to new and improved, elongated, microcrystalline, sintered bauxite, abrasive grain of uniform cross section normal to the length thereof and with a longitudinal to transverse dimensional ratio substantially greater than 1:1. The invention is also concerned with new and highly efficient grinding wheels made from such grain, as well as to a novel method of making such grain.

The principal products manufactured for use as abrasive grain are silicon carbide and alumina although in recent years zirconium oxide and boron carbide have been used to some extent. All of these materials require the use of very high temperatures in their manufacture and particularly in the case of the fused abrasives, alumina being the most widely used, their production is both time-consuming and expensive.

The abrasive properties of fused alumina granules are well-known, and they have found extensive use as abrasive grain in heavy duty (i.e. high pressure) grinding operations, such as in the snagging of billets of stainless and high alloy steels. Indeed until recently practically all snagging wheels made have utilized such grain.

The principal mineral source of alumina is bauxite ore which contains in addition to hydrated aluminum oxide, minor amounts of iron oxide, silica, titania, and other oxides. Because these oxide impurities have been thought to prevent the transformation of bauxite directly into satisfactory aluminous abrasive grain by ordinary ceramic sintering techniques, alumina abrasive grain has until recently been prepared by high temperature smelting in electric furnaces thus providing a product relatively free of these oxides.

Recently, sintered aluminous abrasive grain has been successfully produced by preparing relatively large bodies from comminuted microcrystalline bauxite, and crushing these bodies into microcrystalline grain which is then rounded and sintered. The grain so produced has an irregular blocky shape which can be described as lying intermediate a cube and a sphere, although it is not truly geometrical. As such, the grain can be further defined as having an average longitudinal to transverse dimensional ratio of about 1:1. Unfortunately, this process is not highly efficient because the fines and dust produced by the crushing and rounding operations require repeated screening operations for their removal and reduce the amount of suitable grain produced for use in grinding wheels, for example snagging wheels, i.e. grain varying in size from 8 grit to 16 grit (−6 to +16 mesh, U.S. Standard), to less than 25 percent of the original starting material in the large bodies. When the grain is further screened to a more limited size range of from 10 grit to 16 grit for snagging wheels, only slightly more than 17 percent of such starting material is available for use. While the unusuable material may readily be reprocessed because the losses occur prior to sintering, the relatively low yield of this process limits its use commercially.

Still more recently, substantial improvement in the aforesaid process has been made wherein the comminuted microcrystalline bauxite is formed directly by extrusion into grain of geometrical shape prior to sintering so that practically all of the starting material is actually utilized in making such grain. However, it was still thought to be desirable to shape the grain by rounding off its edges and thereby obtain an over-all smooth grain surface. The grain produced by this process had an average longitudinal to transverse dimensional ratio of about 1:1, just as the grain produced by crushing large bodies. Comparative grinding wheels tests have not shown a substantial increase in grinding efficiency of the extruded and rounded grain over the crushed and rounded grain.

Accordingly, it is an object of the present invention to provide sintered aluminous abrasive grain that is very efficient in abrasive wheels for heavy duty grinding, such as snagging wheels, and which may be economically produced directly from the finely divided raw material in elongated, regular, geometrical shapes and controlled grit sizes.

Another object of the invention is to provide sintered aluminous abrasive grain of the character described which is characterized by the longitudinal to transverse dimensional ratio of the grain being substantially greater than 1:1.

A further object of the invention is to provide grinding wheels which have substantially improved grinding efficiency in heavy duty operations such as the snagging of billets of stainless and high alloy steels and which incorporate the novel, elongated abrasive grain of the present invention.

Still another object of the invention is to provide a heavy duty grinding wheel of the character described which contains abrasive grain of a single grit size and shape yet performs as though it contained abrasive grain of a variety of sizes and shapes, i.e. in performance it seems to have the effect of a so-called grit combination.

These and other objects and advantages of the present invention will become apparent upon consideration of the following detailed description and the accompanying drawings wherein.

Figure 2:
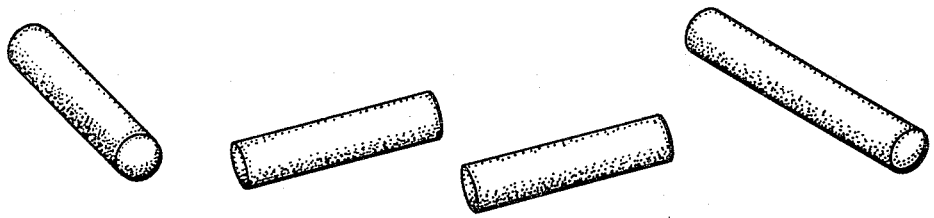
FIGURE 2 illustrates several individual abrasive grains according to the invention, magnified about 5 times their actual 12 grit size.
Figure 3:
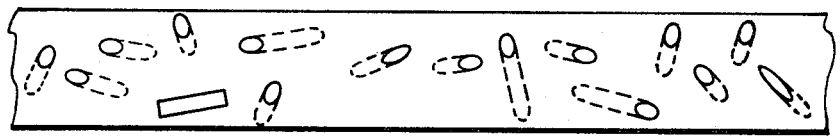

FIGURE 3 is a fragmentary, schematic, edge view, on a reduced scale, of a snagging wheel incorporating abrasive grain like that shown in FIGURE 2, and illustrates the random disposition of a number of such grains resulting in the grit combination effect mentioned above; and FIGURE 4 is a fragmentary, schematic, front elevational view of the wheel shown in FIGURE 3 that illustrates the random distribution and interlocking effect of a number of the novel abrasive grains.

The preferred aluminous mineral source material for producing the novel abrasive grain of the present invention is calcined bauxite. This is low in cost and readily available, although uncalcined or raw bauxite ore may also be used. In its natural state, bauxite includes hydrated alumina and minor amounts of silica, titania, iron oxide, and other impurities. During calcination, most of the water is removed from the bauxite ore and it is reduced to small particles of about ¾ inch size and finer for ease of processing.

The composition of calcined bauxite may vary as is shown, for example, in Table I wherein analyses of ore from two different sources are given in percentages by weight.

TABLE I

| Source of Bauxite | Demerara | Surinam |
|---|---|---|
| $Al_2O_3$ | 87.57 | 85.67 |
| $SiO_2$ | 6.51 | 3.44 |
| $Fe_2O_3$ | 2.00 | 5.85 |
| $TiO_2$ | 2.85 | 3.73 |
| CaO | <0.10 | Trace |
| MgO | Trace | <0.10 |
| Ignition loss | 0.97 | 1.21 |
|  | 100.00 | 100.00 |

Surinam bauxite is preferred for carrying out the present invention because it is high in iron oxide and low in silica as compared with Demerara bauxite, and thereby produces somewhat harder and less friable grain. However, the invention can be practiced satisfactorily with other types of bauxite.

Figure 1:
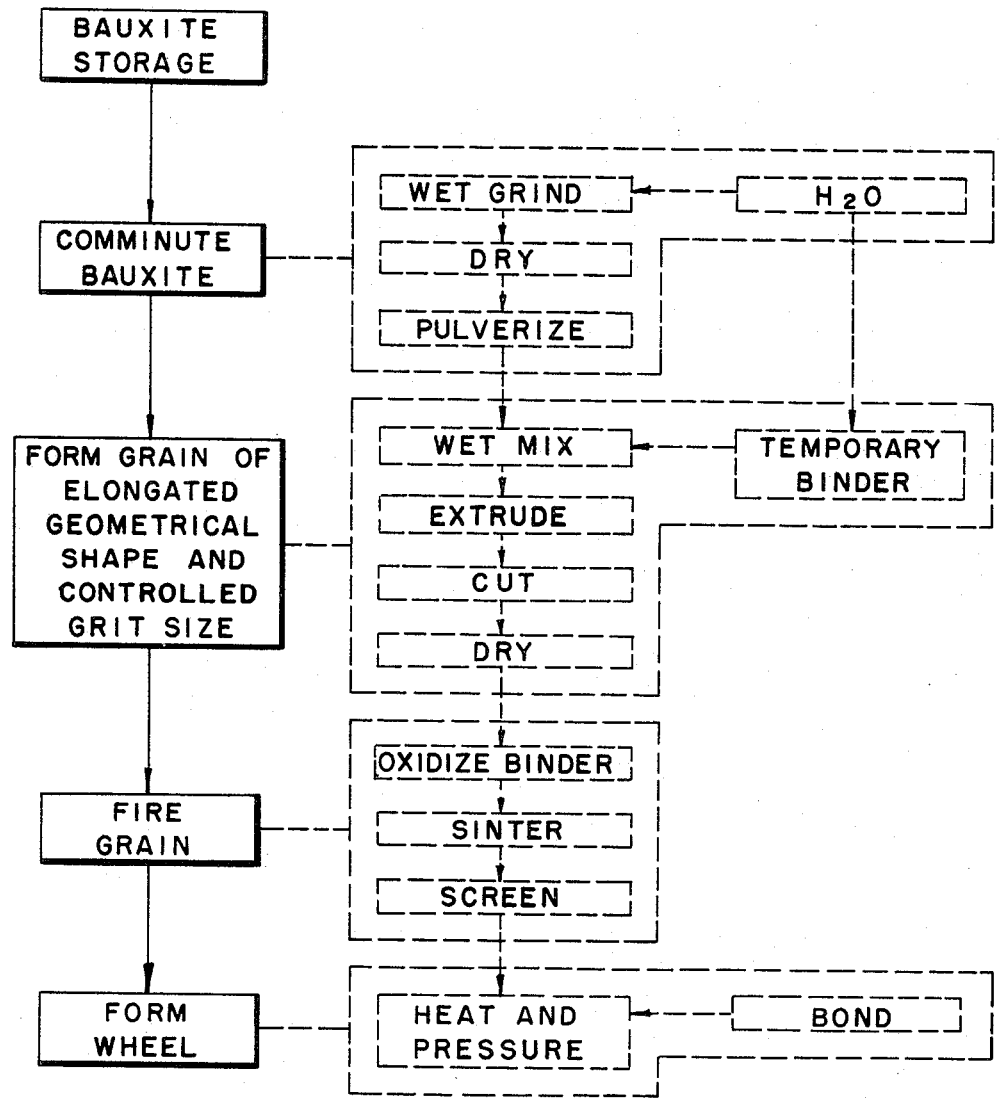
FIGURE 1 is a flow diagram illustrating schematically procedure for producing the novel abrasive grain and a grinding wheel containing such grain, the basic steps being indicated by the solid line enclosures to the left and the individual operations making up the basic steps being indicated by the broken line enclosures to the right.

Referring to FIGURE 1, the method of the invention comprises three basic steps for making the novel abrasive grain. These steps are: (1) comminuting aluminous mineral material such as bauxite into fine, microscopic particles; (2) forming the comminuted material directly into grain of elongated geometrical shape having uniform cross sections normal to the length thereof and longitudinal to transverse dimensional ratios substantially greater than 1:1, having controlled grit size, and severally being composed of many of such fine particles; and (3) firing the grain until sintered. Novel abrasive wheels according to the present invention may be produced from such sintered abrasive grain by conventional procedures.

To ensure success in carrying out the invention, it is essential that the first basic step of comminuting be sufficiently complete to reduce the ore to particles of very fine microscopic size. It has been found that particles having a size of the order of 2.5 microns will produce sintered grain which has a microcrystalline particle size of the order of 5 microns, an acceptable $Knoop_{100}$ hardness of about 1100, and an acceptable friability for satisfactory grinding performance in a snagging wheel.

As shown in FIGURE 1, the comminuting step actually involves several operations on the bauxite. The first is a wet grinding operation which is preferably performed in a rotary ball mill using alumina balls as the grinding media, the grinding being continued until the desired homogeneity, fine particle size, and size distribution are obtained. However, satisfactory results have been obtained with a vibratory mill using either steel or alumina grinding media, even though the resulting powder is less homogeneous in particle size. Prior to this wet grinding operation, the calcined bauxite may, if desired, be roll crushed to about −20 mesh and finer in order to reduce the time required for the wet grinding.

The extremely fine particles of bauxite emerge from the milling operation as a wet slurry which is then partially dried. This operation may readily be performed by a steam table treatment or by centrifuging the slurry, the resulting product being in the form of a moist cake containing about 25 percent by weight of water. This cake is then completely dried in any suitable manner, as in an oven.

The comminuting step is then completed by a pulverizing operation. The purpose of this operation is to break up the dried cake into agglomerates of the finely ground, microscopic particles sufficiently small as to facilitate direct formation of the abrasive grain which is the second basic step in the inventive sequence. This pulverizing operation may be performed in any suitable manner, as by the use of rollers for example, it being noted that no further reduction in the size of the particles occurs, the desired size having already been obtained by the ball milling operation.

Alternatively, the slurry can be dewatered to directly form a cake of proper moisture content for mixing with a binder and forming into granular bodies. This eliminates the necessity of drying the cake completely and the subsequent pulverizing operation. As still another possibility, the bauxite can be dry milled and pulverized to the desired microscopic size and then mixed with the binder and water for subsequent forming into granular bodies. This latter alternative completely eliminates the necessity for drying and subsequent pulverizing.

As will be evident from FIGURE 1, the forming step preferably includes three operations, the first of which is mixing the finely pulverized bauxite with a suitable temporary binder such as one containing a major portion of starch and a minor proportion of methylcellulose or bentonite, to facilitate extrusion. It has been found that not only is thoroughly mixing essential to provide a plasticized mix for proper extrusion, but also that the more thorough the mixing the greater the improvement in friability of the resulting grain. Likewise, dissolution of a starch-bentonite binder prior to mixing has been shown to improve friability. Alternatively, an inorganic binder may be used in place of the temporary binder. Typically, bentonite in an amount constituting about 3 percent by weight of the mix has been found to be suitable. In some cases, also, non-aqueous liquids, for example kerosene or alcohol, can be used in place of water to form the extrudable mix.

The grain forming step is carried forward by extruding a quantity of the wet mix through a die to form rods of uniform geometrical cross section normal to their lengths and subsequently cutting or sundering the rods into grain severally composed of many of the aforesaid microscopic particles of bauxite. Preferably, the rods are solid and cylindrical in shape with a uniform circular cross section.

As the rods emerge from the die, they may be reduced to the desired lengths by any suitable means such, for example, as a rotating wire cutter mounted adjacent the face of the die.

As previously pointed out the novel abrasive grain produced in accordance with the present invention has a longitudinal to transverse dimensional ratio substantially greater than 1:1. This ratio can vary but it is important that the lengths of the several grains be such that the average ratio is at least 1.5:1. It is generally preferred to have the dimensional ratio somewhat greater, even up to about 3 to 5:1, since in some cases at least when forming abrasive wheels from the present novel grain some of the individual grains are broken. Although still higher ratios are possible, it is considered that these are generally not practical because of the greater ease of breaking grain of such dimensions. It will be understood that grain thus produced is of controlled grit size since the diameter is determined by the size of the orifice in the extrusion die and the length is regulated as desired.

Typically, one may use a screw-type extruder, having a die plate drilled to provide a series of circular openings preferably of the same size, but larger than the specific grain size desired by about one grit size to allow for shrinkage of the grain during sintering. For making grinding wheels these openings may, for example, vary in diameter from 0.0469 inch for 24 grit to 0.1250 inch for 8 grit. Of course, the sizes of the die holes can be varied to provide a wider or smaller range of grit sizes depending upon the particular end use desired. For example, grit as small as or even smaller than 36 could be prepared for use in coated abrasives.

As also will be evident, other shapes may be extruded. Thus, the extruded rods may be square or triangular in cross section, and hollow if desired, and the proper die hole sizes for these various shapes can be readily determined. In all cases, of course, the grain produced from the extruded shapes will be elongated with a transverse cross section of substantially constant shape and dimensions and a longitudinal to transverse dimensional ratio within the limits set forth above.

The most important feature of this grain-forming step is that, as described above, the comminuted aluminous material is directly formed into grain of the desired size and shape, with no appreciable waste of the original material. It has also been found, contrary to prior views, that improved grinding efficiency is obtained if the elongated grain is not rounded but is left with the ends thereof having sharp and unrounded edges. The grain forming step is completed by drying the grain in any suitable manner.

The third basic step in the process of this invention is the firing step, and it also includes several operations as illustrated in FIGURE 1. The first operation is to oxidize the organic binder when one is used. Otherwise the grains could be unduly porous and friable, making them unsuitable for grinding, especially for heavy duty snagging operations. This is accomplished by firing the grain at a temperature in the range between about 700° C. and about 1100° C., which is below sintering temperature, and in an oxidizing atmosphere until the temporary binder is burned out. The length of time for which the grain must be held at oxidizing temperature will obviously vary inversely with temperature, it having been found that a period of 2 hours at 1100° C. is adequate for complete oxidation of the binder. As noted above, an organic temporary binder may be replaced by an inorganic binder. In this case, the oxidizing operation is eliminated.

Once the organic temporary binder has been removed, the grain is fired until sintered at a temperature in the range from about 1300° C. to about 1600° C. While the sintering time may vary depending upon the particular temperature and atmosphere employed, it has been found that 4 minutes is adequate for complete sintering at some temperatures within the temperature range just mentioned and the preferred atmospheric range and that longer times, e.g., up to 64 minutes, may be satisfactorily employed at lower temperatures.

As for the sintering atmosphere, this may range from oxidizing to reducing. Typical firing mixtures are: 20 percent excess air for oxidation, and 20 percent excess gas (such as propane or natural gas) for reduction, based on the normal or theoretical mixture of gas and air for complete combustion. For maximum hardness and acceptable friability of the grain, the preferred sintering temperature range is from about 1400° C. to about 1500° C., the preferred atmosphere is normal or oxidizing, and the preferred time is about 10 minutes. while friability is primarily dependent on firing temperature, a slightly reducing atmosphere is conducive to promoting low friability at any one temperature. Therefore, a normal or oxidizing atmosphere is preferred to obtain the optium combination of hardness, toughness, and grinding efficiency. As indicated above, during sintering of the grain shrinkage takes place so that the resulting grain is of controlled grit size.

The firing step is now complete for all practical purposes, and the sintered grain has a relatively smooth surface appearance as indicated in FIGURE 2. However, the grain may be screened, if desired, to ensure that no large stray material is present.

Figure 4:
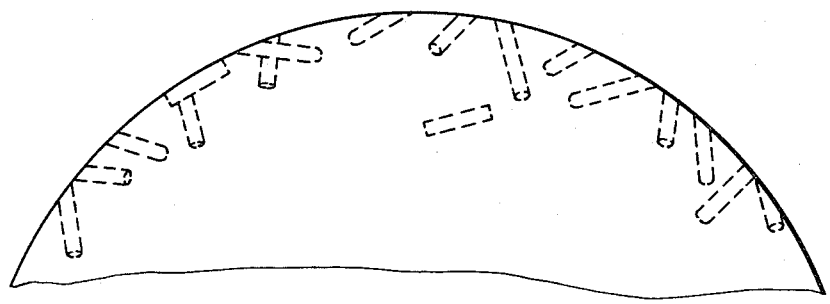

The sintered grain may be employed in the formation of a grinding wheel such as the snagging wheel partially and schematically illustrated in FIGURES 3 and 4. This may be accomplished by generally conventional procedures, for example, by mixing the grain and a suitable organic bond, with or without filler, then cold-pressing the mix in a mold, and thereafter heating the pressed body to cure or harden the bond, which is preferably of the thermosetting type, such as a phenolic resin. Alternatively, suitable ceramic or thermoplastic bonds may be used, depending upon the desired end use of the wheel.

When making a heavy duty grinding wheel in accordance with the present invention, however, it is preferred that the fired grain be mixed with the desired amount of thermosetting binder, such as a phenol-formaldehyde resin, and filler material, such a powdered cryolite (200 mesh and finer) or granular pyrites (36 mesh and finer), after which the resulting mix is hot pressed to the desired shape. This procedure produces wheels of maximum strength and density for heavy duty grinding operations such as snagging stainless steel billets.

As will be pointed out more in detail below, grinding wheels made in accordance with the present invention have a significantly higher grinding efficiency than wheels differing therefrom only in that the abrasive grain was rounded and had an average longitudinal to transverse dimensional ratio of about 1:1. It will also be shown that grinding wheels according to the invention have a grinding efficiency significantly better for both high and low pressure snagging operations than similar wheels using conventional, fused alumina grain.

EXAMPLE

The following specific example will illustrate the present invention. Abrasive grain of 12 grit size was prepared as follows from calcined Surinam bauxite having the composition set forth in Table I and a crushed size of about ¾ inch.

This material was fed to a five-foot diameter by five-foot long rotary ball mill having a fused cast aluminous lining and using sintered alumina balls. The mill charge was as follows:

|  | Lbs. |
|---|---|
| Bauxite | 1400 |
| Water | 2100 |
| Alumina balls (2″ to 1″ diameter) | 2500 |

Milling was carried on for 100 hours and the resulting slurry of very fine, microscopic particles was partially dehydrated by centrifugal action leaving a cake containing about 25 percent by weight of water. This cake was completely dried and then pulverized by rollers to complete the comminuting step.

Chemical analysis of the finely comminuted material revealed approximately the following composition.

TABLE II

|  | Percent by wt. |
|---|---|
| $Al_2O_3$ | 86.55 |
| $SiO_2$ | 3.40 |
| $Fe_2O_3$ | 4.69 |
| $TiO_2$ | 2.49 |
| CaO | 0.72 |
| MgO | 0.32 |
| Ignition loss | 1.83 |
|  | 100.00 |

By comparison with the pre-milled bauxite, both $TiO_2$ and $Fe_2O_3$ were slightly reduced by dilution during grinding, which dilution was caused by attrition of the alumina ball grinding media and the lining of the mill. The small increase in CaO could be due to pick-up from the Portland cement used to hold the lining in the mill and/or the alumina grinding balls which contain less than 1 percent CaO. Obviously, the alumina pick-up was from the alumina balls and lining, while the loss of $SiO_2$ as well as the pick-up of MgO was negligible. Overall, the composition following milling was not significantly changed as a desired high ratio of iron oxide to silica for producing harder and less friable grain was still retained, even though more $Fe_2O_3$ was lost than $SiO_2$.

Microscopic analysis of the finely ground bauxite particles showed the following particle size distribution.

TABLE III

| Distribution, percent: | Microns |
|---|---|
| 100 | <2.50 |
| 80 | <1.25 |
| 60 | <1.05 |
| 50 | <1.00 |
| 40 | <0.94 |
| 30 | <0.90 |

TABLE III—Continued

| Distribution, percent: | Microns |
|---|---|
| 20 | <0.82 |
| 10 | <0.74 |
| 0 | <0.41 |

The bauxite referred to in this example was wet milled for 100 hours to produce this particle size distribution. However, a suitable particle size range may be achieved in less time, such as 50 hours, but with less uniform size distribution.

Next, the pulverized bauxite was thoroughly mixed with a suitable starch-methyl cellulose binder in the following proportions:

| | Percent by wt. |
|---|---|
| Bauxite | 93.50 |
| General Mills No. 30 starch | 6.00 |
| Dow Chemical Methocel methyl cellulose | 0.50 |
| | 100.00 |

The resultant plasticized mix was extruded through a multi-hole die having a hole diameter of 0.0938 inch (3/32) to produce solid cylindrical rods of uniform circular cross section which were wire cut into grain of about 5/16 inch in length, i.e. slightly more than 3 times grain diameter. Following this, the grain was first air dried and then oven dried at 150° C., in preparation for the firing step.

This step was carried out by first firing the grain to 1100° C., in a gas fired kiln for a period of two hours in an oxidizing atmosphere in order to completely remove the temporary binder. Next, the grain was sintered in a rotary, gas-fired kiln at 1450° C. for ten minutes in a normal atmosphere. After cooling in air, the fired grain, which shrank during sintering to the desired 12 grit size, was screened to remove any large stray material.

As will be evident, with the appropriate equipment, the oxidizing and sintering operations could readily be carried out in a continuous manner. For example, a rotary kiln could, if desired, easily be made long enough to provide two hot zones, one at the temperature desired for oxidizing an organic temporary binder and the other at the desired sintering temperature, as well as two atmospheres, oxidizing for the first hot zone and normal for the second hot zone.

The grain-forming and firing steps of the process were repeated to make grain of Nos. 10, 14 and 16 grit size with about the same diameter to length ratio, in order to produce snagging wheels with grit of different coarseness or fineness.

Samples of each of the grit sizes were subjected to microscopic analysis which revealed that the microcrystalline particles making up the several grains were of the order of 5 microns in size. Grinding tests revealed that for snagging wheels the average $Knoop_{100}$ hardness of the individual grains should not be less than about 1100, and confirmed the fact that this property does not vary significantly with variation in grit size. As for friability, these tests showed that the relative friability index of the grain for snagging wheels should not exceed substantially the following values for the various grit sizes.

TABLE IV

| Grit No.: | Relative friability index |
|---|---|
| 16 | 19 |
| 14 | 14 |
| 12 | 11 |
| 10 | 6 |

The terms friability or relative friability index are used herein as an inverse measure of toughness. More specifically, these terms indicate the cross sectional reduction in size of grain which has been subjected to carefully controlled, uniform milling conditions. In measuring this quantity, grain of the particular grit size is first regraded between two adjacent screens so that 100 percent passes through the larger screen which is one size larger than nominal grit size and 100 percent remains on the finer screen which equals nominal grit size. A specified amount of the abrasive material is then milled under uniform conditions and once again regraded on a screen one screen number finer than nominal grit size. The percent of abrasive material passing through this screen is the relative friability index. The index is relative because it is based upon a standard test for fused alumina grain of medium toughness in which the grain exhibits a 50 percent breakdown (i.e. 50 percent of the starting material passes the screen one number finer than nominal grit size) for each grit size tested.

The fired grain of 12 grit size produced in the foregoing example was then incorporated in a snagging wheel having the following dimesions: diameter, 12 inches; thickness, 1 inch; arbor hole, 2 inches; and commonly referred to in the art as a 12 x 1 x 2 wheel. This wheel had the following composition:

| Materials: | Percent by wt. |
|---|---|
| Abrasive grain | 69.00 |
| Phenol-formalidehyde resin | 9.40 |
| Iron pyrite ($FeS_2$) filler | 9.00 |
| Potassium fluoborate ($KBF_4$) filler | 4.30 |
| Gypsum ($CaSO_4$) filler | 5.80 |
| Salt (NaCl) | 1.50 |
| Lime (CaO) | 1.00 |
| | 100.00 |

The abrasive grain was placed in a mixer and wet with 5 cc./1000 grams of mix of a refined, coal-tar creosote oil, wetting agent manufactured and sold under the registered trademark Carbosota by Allied Chemical and Dye Corporation. The remaining ingredients were first blended and then thoroughly mixed with the wetted grain until the mix was homogeneous. The mix was placed in a suitable mold, was hot pressed until the resin set up, and was then removed. After removal from the mold, the wheel was given an after-cure of 8 hours at 335° F., followed by the usual finishing and truing operations.

As diagrammatically shown in FIGURES 3 and 4, the elongated, geometrically shaped abrasive grain of the present invention is distributed throughout the wheel structure with the individual grains randomly oriented. Thus cutting surfaces at various angles and of various shapes and sizes are presented at the wheel surface, as indicated in FIGURE 4, with the result that a grit combination effect is achieved even with grain of only a single grit size. The sharp edges of the elongated grain always present a sharp point of attack to the work which results in initial fast cutting. Not only are the elongated abrasive grains embedded deeper in the bond, thus permitting more use of the abrasive but they also have an interlocking effect which reinforces the wheel and provides greater wheel strength. Moreover, wheels incorporating the elongated grain of the present invention produce an improved grinding finish, grind considerably cooler than wheels incorporating other types of abrasive grain, and use significantly less horsepower per pound of metal removed.

For comparative purposes, two additional sets of three wheels each were made identical in all respects to a three wheel set (A) made according to the foregoing example except for the abrasive grain used. One of the additional sets of wheels (B) contained extruded and rounded sintered bauxite grain with a longitudinal to transverse dimensional ratio of about 1:1, this grain, like the grain of set (A), being of 12 grit size only. The third set of wheels (C) contained tough fused alumina grain which was comprised of a mixture of 10, 12, 14 and 16 grit, in accordance with standard practice, in the following proportions by weight: 10 grit, 33.33 percent; 12 grit, 33.33 percent; 14 grit, 16.67 percent, and 16 grit, 16.67 percent. In all the wheels, the abrasive occupied the same volume, and each wheel was tested on a rotary snagging machine grinding 304 stainless steel at 9500 s.f.m. under each of the following head pressures: 325, 400 and 475 lbs. The average results of the tests are shown below.

TABLE V

| Set | Head Pressure, lbs. | Metal Removed (M), lbs. | Wheel Loss (W), lbs. | Ratio M/W | Efficiency Factor, M²/W |
|---|---|---|---|---|---|
| A | 325 | 4.25 | 0.160 | 26.6 | 112 |
|   | 400 | 15.00 | 0.310 | 48.4 | 726 |
|   | 475 | 35.70 | 1.110 | 32.2 | 1,148 |
| B | 325 | 2.45 | 0.240 | 10.2 | 25 |
|   | 400 | 9.50 | 0.310 | 30.6 | 291 |
|   | 475 | 25.10 | 1.340 | 18.7 | 470 |
| C | 325 | 13.32 | 0.670 | 19.9 | 265 |
|   | 400 | 22.76 | 1.570 | 14.5 | 330 |
|   | 475 | 35.44 | 2.867 | 12.4 | 438 |

At each head pressure used, the abrasive wheels of Set A had a substantially better ratio of metal removed to wheel loss (M/W) than either of the other two sets of wheels tested. As for the efficiency or quality factor, this was considerably greater for the elongated grain wheels (Set A) than that of the equidimensional grain wheels (Set B) at each pressure and that of the fused alumina grain wheels (Set C) at the two higher pressures. It is thus evident that the grinding performance of abrasive wheels containing sintered bauxite grain having a length to diameter ratio substantially greater than 1:1 and uniform cross section is unexpectedly good.

Moreover, when the horsepower per pound of metal removed was measured for the wheels of Sets A and B, at 475 lbs. head pressure, the following results were obtained:

TABLE VI

Set: H.P./lb. metal removed
A _____ 1.1
B _____ 1.6

Field tests comparing sets of 3 wheels made with these same two types of bauxite abrasive grain as in Sets A and B under the same conditions except that the wheels were made 24" x 3" x 12" in size and were tested under 750 lbs. head pressure and at 12,500 s.f.m., also showed the superiority of wheels containing grain produced according to the present invention. The average results are shown in Table VII.

TABLE VII

| Set | Wheel Life, hrs. | Metal Removed, lbs. | Metal Removed per hr. | Cost/lb. Metal Removed |
|---|---|---|---|---|
| D | 12.0 | 3,020 | 252 | $.070 |
| E | 13.3 | 2,650 | 200 | .087 |

The wheels of Set D contained sintered bauxite grain made according to the present invention while the wheels of Set E were made with extruded, rounded, sintered bauxite abrasive grain having a longitudinal to transverse dimensional ratio of about 1:1.

In still another test, 3-wheel sets of 12" x 1" x 2" abrasive wheels with the same bond composition were compared. Set F employed 12 grit sintered bauxite abrasive grain made according to the present invention, Set G contained 12–16 grit commercial, tough fused alumina. These wheels were cold pressed. Set H contained 12–16 grit commercial, medium tough fused alumina, having a freer cutting nature, and the 3 wheels of the set were hot pressed. The cold pressed wheels had the following composition.

| Material: | Percent by wt. |
|---|---|
| Abrasive grain | 70.8 |
| Phenol-formaldehyde resin | 10.4 |
| Iron pyrite (FeS₂) filler | 11.0 |
| 85% furfural–15% cresol blend (by wt.) | 2.4 |
| Soda ash | 2.4 |
| Salt (NaCl) | 1.8 |
| Lime (CaO) | 1.2 |
|  | 100.00 |

The fused grain wheels of Set G were cold pressed to a density of 48.0 grams per cubic inch, and the wheels (Set F) according to the invention were cold pressed to a comparable density so as to have the same abrasive volume. These wheels were cured in a 48-hour cycle having a maximum temperature of 350° F. for 10 hours, and then finished and trued in the usual manner. The average results of the grinding tests under the same conditions as for the tests of Table V, except at lower pressures, are shown in the table below.

TABLE VIII

| Set | Wheel Type | Head Pressure, lbs. | Metal Removed (M), lbs. | Wheel Loss (W), lbs. | Ratio M/W | Efficiency Factor, M²/W |
|---|---|---|---|---|---|---|
| F | Cold | 250 | 34.5 | 0.9 | 38.3 | 1,323 |
|   | Pressed | 325 | 30.9 | 0.7 | 44.14 | 1,364 |
| G | Cold | 250 | 16.9 | 1.1 | 15.4 | 260 |
|   | Pressed | 325 | 19.5 | 1.6 | 12.2 | 238 |
| H | Hot | 250 | 15.1 | 0.82 | 18.41 | 278 |
|   | Pressed | 235 | 19.1 | 1.05 | 18.19 | 347 |

At each pressure used, the wheels of Set F, according to the invention, had a substantially better efficiency factor and ratio of metal removed to wheel loss than either of the other two types of wheels tested. Thus, it is seen to be possible to produce a cold pressed wheel from grain according to the invention which is significantly superior to a considerably more dense and more expensive hot pressed fused alumina wheel for grinding at lower pressures.

From the foregoing, it is readily apparent how the present invention accomplishes its various objectives. While t'e invention has been described and illustrated herein with reference to certain preferred embodiments thereof, it is to be understood that it may be otherwise embodied within the scope of the appended claims.

Except when otherwise indicated, parts and percentages herein are by weight. Mesh sizes are those of the Tyler Screen Series.

I claim:
1. Microcrystalline, sintered bauxite abrasive grain of controlled grit size having a longitudinal to transverse dimensional ratio substantially greater than 1:1 and a uniform cross section normal to the length thereof.

2. Microcrystalline, sintered abrasive grain as defined in claim 1 in which the average longitudinal to transverse dimensional ratio is at least 1.5:1.

3. Microcrystalline, sintered abrasive grain as defined in claim 1 in which the edges of said grain are sharp and unrounded.

4. Microcrystalline, sintered abrasive grain as defined in claim 2 in which the edges of said grain are sharp and unrounded.

5. Microcrystalline, sintered abrasive grain as defined in claim 1 in which the average longitudinal to transverse dimensional ratio is from about 3:1 to 5:1.

6. Microcrystalline, sintered abrasive grain as defined in claim 2 in which the grain is circular in cross section.

7. A method of directly making microcrystalline, sintered, aluminous abrasive grain which comprises: forming an extrudable mixture from finely comminuted aluminous abrasive material consisting essentially of calcined bauxite, a liquid, and a binder; extruding said mixture into rods of uniform cross section; sundering said rods to produce grain having a longitudinal to transverse dimensional ratio substantially greater than 1:1 and each grain comprising a plurality of particles of said aluminous abrasive material; drying said grain; and thereafter firing it, whereby to shrink said grain and to sinter said particles together to provide abrasive grain of controlled grit size.

8. A method as set forth in claim 7 in which said liquid is water.

9. A method as set forth in claim 8 in which said grain has a longitudinal to transverse dimensional ratio of at least 1.5:1.

10. A method as set forth in claim 8 in which said grain is fired at a temperature in the range from about 1300° C. to about 1600° C.

11. A method as set forth in claim 8 in which said grain is fired at a temperature in the range from about 1400° C. to about 1500° C.

12. A method as set forth in claim 8 in which, prior to said firing, said grain is heated in an oxidizing atmosphere to a temperature in the range from about 700° C. to about 1100° C.

13. An abrasive wheel comprising microcrystalline, sintered bauxite abrasive grain of controlled grit size having a longitudinal to transverse dimensional ratio substantially greater than 1:1 and a uniform cross section normal to the length thereof, and a bond therefor.

14. An abrasive wheel as defined in claim 13 in which the abrasive grain is formed from bauxite and the average longitudinal to transverse dimensional ratio is at least 1.5:1.

15. An abrasive wheel as defined in claim 14 in which the edges of said grain are sharp and unrounded.

16. An abrasive wheel as defined in claim 14 in which said bond is a heat-hardened resin.

17. An abrasive wheel as defined in claim 14 in which said abrasive grain is randomly oriented in said wheel and presents cutting surfaces at various angles and of various shapes and sizes at the wheel surface.

References Cited

UNITED STATES PATENTS

| | | | |
|---|---|---|---|
| 2,694,004 | 11/1954 | Coffeen | 51—308 |
| 2,877,103 | 3/1959 | Lane | 51—298 |
| 3,079,243 | 2/1963 | Ueltz | 51—298 |
| 3,183,071 | 5/1965 | Rue et al. | 51—309 |

D. J. ARNOLD, *Primary Examiner.*

UNITED STATES PATENT OFFICE
CERTIFICATE OF CORRECTION

Patent No. 3,387,957                         June 11, 1968

Elmer E. Howard

It is certified that error appears in the above identified patent and that said Letters Patent are hereby corrected as shown below:

Column 1, line 70, "unusuable" should read -- unusable --. Column 2, line 1, before "substantial" insert -- a --; line 12, "wheels tests" should read -- wheel tests --. Column 4, line 16, "thoroughly" should read -- thorough --. Column 5, line 46 "while" should read -- While --; line 50, "optium" should read -- optimum --. Column 6, line 1, "such a" should read -- such as --. Column 10, TABLE VIII, third column, line 6 thereof, "2 should read -- 325 --; line 32, "t'e" should read -- the --.

Signed and sealed this 16th day of December 1969.

(SEAL)
Attest:

Edward M. Fletcher, Jr.                     WILLIAM E. SCHUYLER, JR
Attesting Officer                             Commissioner of Patents